Patented Apr. 11, 1944

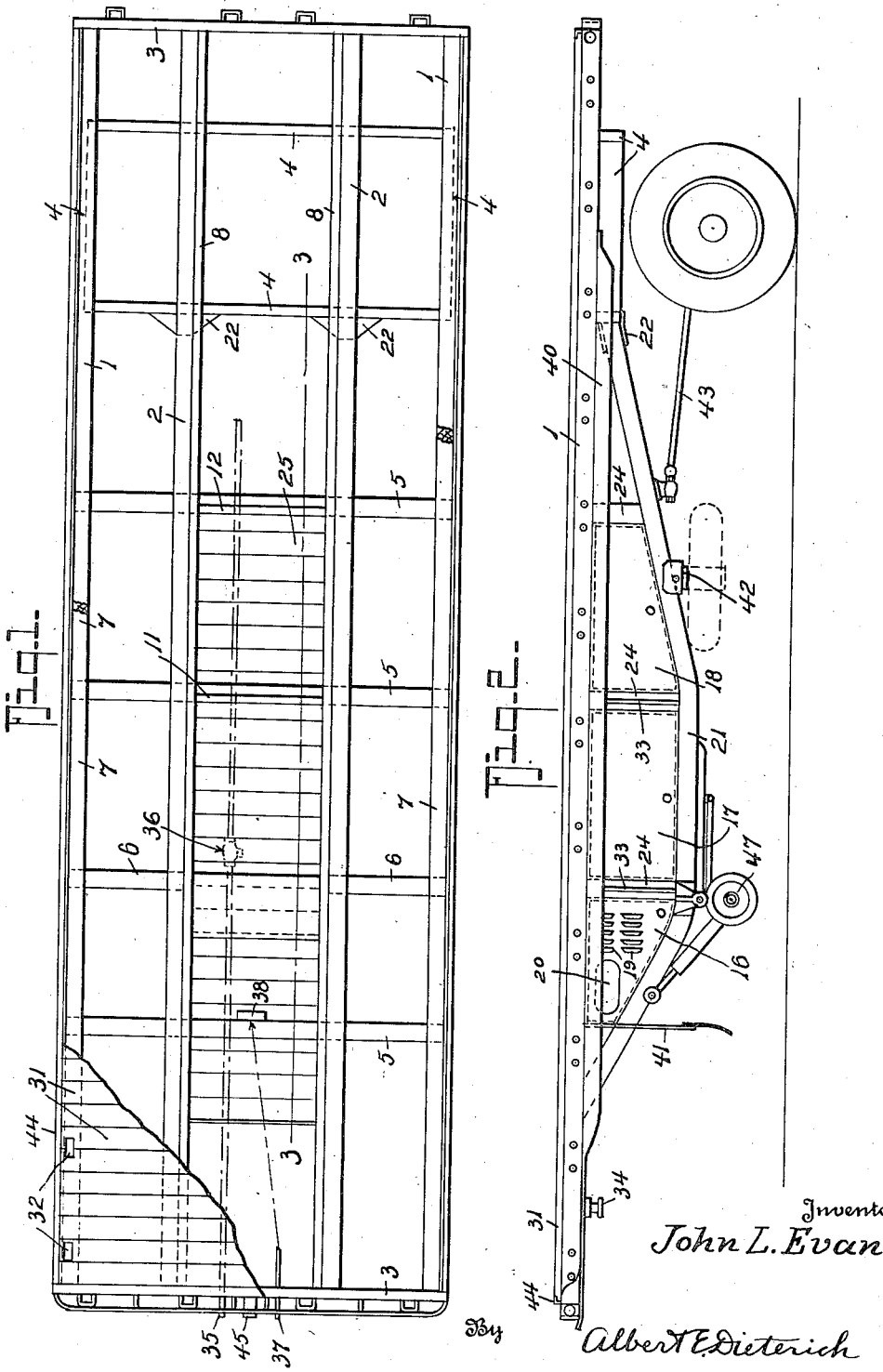

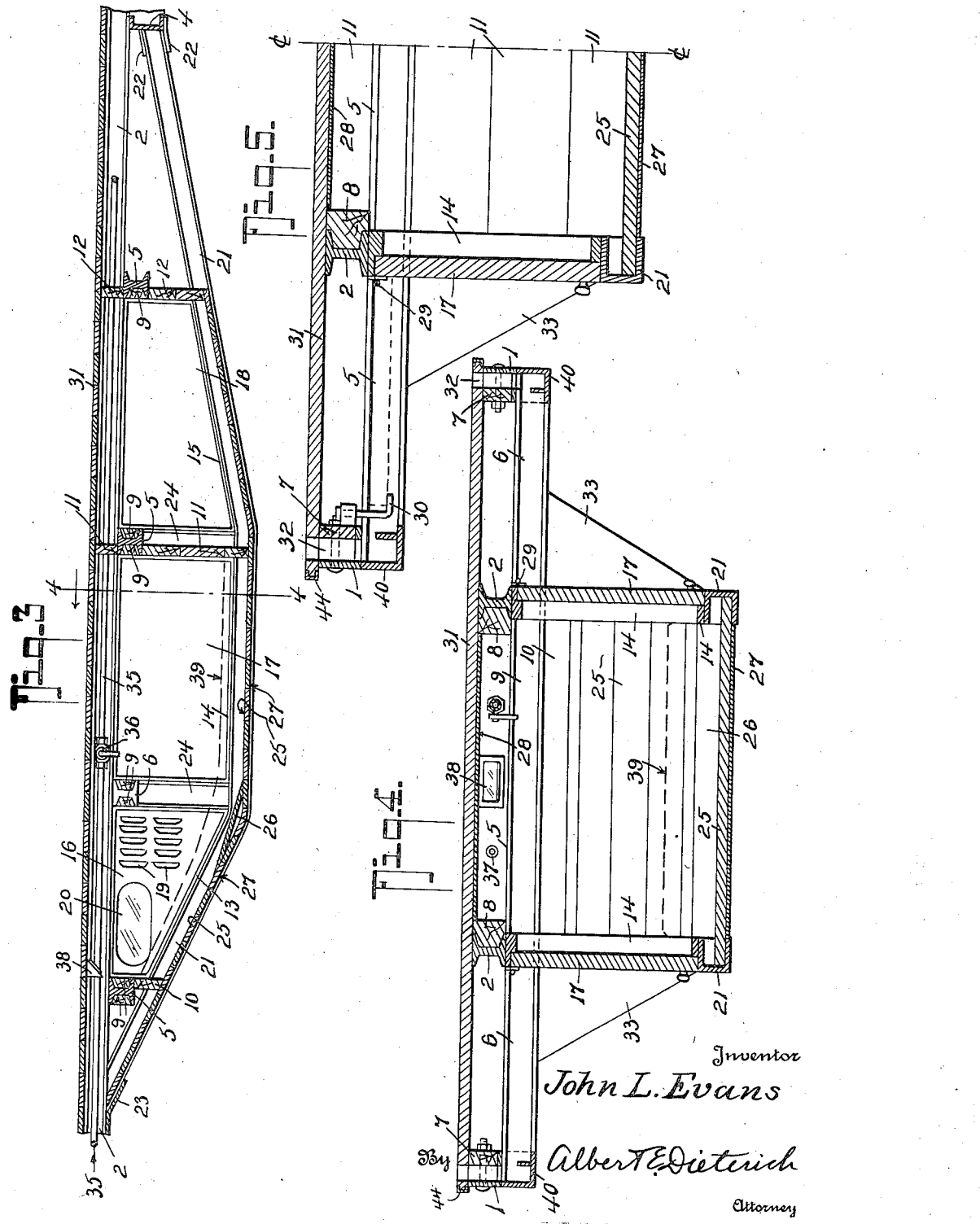

2,346,130

UNITED STATES PATENT OFFICE 2,346,130

VEHICLE

John Linwood Evans, Sumter, S. C.

Application June 13, 1941, Serial No. 397,974

7 Claims. (Cl. 280—106)

My invention relates to trailers and so-called semi-trailers, the invention—for purposes of illustration and not limitation—being illustrated in the accompanying drawings as applied to a semi-trailer.

Primarily my invention has for an object to provide a trailer or semi-trailer constructed so as to provide a strongly constructed and reinforced frame of such nature that it may be provided with means to enable the vehicle to serve not only as a load carrier but also as a safe sleeper for a driver of the towing vehicle or his assistant.

Further, it is an object to provide a vehicle frame, composed of the usual rectangular frame and cross beams, but reinforced by the provision of a centrally disposed sub-frame, braced by means of longitudinally disposed, drop truss beams, the whole being so arranged and designed that, if desired, the vehicle may be converted into a sleeper by the addition of a subfloor, side doors, etc.

Other objects will in part be obvious and in part pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a top plan view of a vehicle embodying my invention, most of the main floor being broken away, as are also the side floor beams that rest on the side longitudinals of the main frame.

Fig. 2 is a side elevation of the semi-trailer shown in Fig. 1, with the sleeping and tool compartments closed and the rear wheels and the reach-rod shown, the usual vehicle springs being omitted for convenience of illustration.

Fig. 3 is an enlarged longitudinal section on the line 3—3 of Fig. 1, the main floor being shown in place.

Fig. 4 is an enlarged cross section on the line 4—4 of Fig. 3, looking forward.

Fig. 5 is a further enlarged half-section on the line 4—4 of Fig. 3, looking rearward.

In the drawings, in which like numbers of reference designate like parts in all the figures, the main frame is composed of the side angle-iron beams 1, the end beams 3, and the cross I-beams 5—5 on which the beams 1 are suitably secured, in any suitable way, by bolts, or welding, for example.

In accordance with my invention, the main frame 1, 3, 5 is reinforced by means of a central sub-frame composed in part of two spaced longitudinal I-beams 2, 2 which rest on and are suitably secured to the cross beams 5. The ends of the longitudinal I-beams 2 are suitably secured to the end beams 3 of the main frame. The central sub-frame also includes the drop truss beams 21, whose forward ends are secured to the beams 2 and to suitable reinforcing plates 23, and whose rear ends are secured to the usual sub-frame 4 and to suitable gusset plates 22 (see Fig. 3).

Short cross I-beams 6 connect the side beams 1 of the main frame with the side beams 2 of the sub-frame (Figs. 1, 3 and 4); spaced vertical pillars 24 connect the beams 2 and 21 to form rigid trusses.

The longitudinal beams 1 of the main frame are preferably formed of angle iron and carry the longitudinal wooden floor sleepers 7 to which the main flooring 31 is nailed, or secured in any approved way. Wooden sleepers 8 are also carried by the I-beams 2, to which sleepers 8 the floor 31 is also fastened.

Transverse filler blocks 9 are suitably secured to the cross beams 5 and 6 (see Figs. 3, 4 and 5 to which the door stop frames 13, 14, 15 are secured in any desired way. Wooden partitions 11 and 12 extend over the rear two I-beams 5 and between the beams 2, 2; other transverse partitions 12 extend below the same cross beams 5 to form the front and back walls of a tool and storage compartment whose sides are constituted by doors 18. A similar partition wall 10 is located beneath the front I-beam 5.

The sub-floor 25 is laid between and carried by the beams 21 and extends from the front end of the beams 21 to the rear wall 12 (Fig. 3). Filler strips 46 (Figs. 4 and 5, not shown in Fig. 3) may be provided in the channel irons 21 if desired.

Where the front bend in the beams 12 occurs I place a fillet of plywood or other suitable material 26, on which fillet and the floor 25, and between the front wall 10 and partition wall 11, a suitable mattress 39 (see broken lines, Figs. 3 and 4) may be placed for the person who is to sleep in the vehicle. The space between walls 10 and 11, floor 25 and floor 31 constitutes the longitudinally disposed sleeping compartment of the vehicle.

This compartment is designed to be enclosed on the sides by doors 16 and 17, hinged at the top as at 29 and capable of being swung outwardly-upwardly, as indicated in dotted lines, Fig. 5, and secured by any suitable fastener or holder 30. The head or forward doors 16 of the sleeping compartment are provided with windows 20 through which the occupant may see and be seen, and suitable ventilating louvres 19 are provided for ventilating the sleeping compartment.

The under side of the flooring 25 is preferably metal, sheathed as at 27 to prevent road dust, dirt and moisture as well as gases from seeping through the floor; suitable splash guards 41 are provided at each side of the central frame to deflect from the sleeper any water and dirt which may be thrown up by the wheels of the towing vehicle. In order that rain or other liquids, as well as dirt and dust, may not filter through the floor 31 into the sleeping and tool compartments, I provide a metal or other suitable ceiling 28 beneath the floor boards 31 (see Figs. 4 and 5). This ceiling 28 may also—and preferably does—extend to the wall 12 over the tool and luggage compartment which is located between the walls 11 and 12 and the floors 31 and 25. The side doors 18 of the tool compartment are hinged to fold upwardly-outwardly, similarly to the doors 16 and 17 of the sleeping compartment. The main, or deck, floor 31 has sockets 32 for body stakes (not shown) and angle irons 40 are secured to and beneath the beams 1 on which irons the ends of the stakes may rest.

The vertical channel irons are braced by corner plates 33 welded or otherwise secured to the same and to the cross beam 5 at the rear of the sleeping compartment and to the short cross beams 6.

When the vehicle is a semi-trailer, the usual fifth-wheel king-pin 34 is located at the front portion of the frame. The usual rear axle housing structure (not shown) is connected to the beams 21 by suitable reach-rods 43 and, if desired, a suitable tire carrier 42 may be mounted on the beams 21 (see Fig. 2).

The vehicle is provided with the usual signal lights (not shown) to which current is conducted from the towing vehicle through conductor connections 37, a lamp 38 being provided to illuminate the sleeping compartment.

The usual air-brake duct 35 passes through the sleeping compartment and is there provided with an emergency valve 36 which the occupant of that compartment may use to set the brakes if desired.

Communication between the cab of the towing vehicle and the sleeping compartment of the trailer may be had, if desired, by an inter-communicating telephone or speaking tube (not shown), run through a suitable conduit 45 (Fig. 1) in the front of the vehicle.

From the foregoing it will be seen that a person within the sleeping compartment lies longitudinally of the vehicle, away from the sides of the same, and is thus protected by the overhanging structure against possible injury should the vehicle overturn.

Furthermore, should the trailing vehicle break loose from the towing vehicle—as in case of failure of the fifth wheel connection, the forwardly-upwardly inclined beams 21 will act as runners or skids to prevent the front end of the frame from digging into the road and possibly buckling the frame, or if the vehicle is provided with a suitable landing gear 47 that gear will serve the same purpose. By arranging for the occupant of the sleeping compartment to sleep lengthwise of the vehicle (in a compartment, in practice, about three feet wide and six and one-half feet long), ample room for the average person is provided. The upward-forward inclination of the floor 25 and the consequent slant of the mattress makes a pillow unnecessary.

From the foregoing description, taken in connection with the accompanying drawings, it is thought that the construction and advantages of the invention will be clear to those skilled in the art.

What I claim is:

1. In a road vehicle, a main frame comprising side longitudinal beams connected together at the ends by cross beams, intermediate cross beams located at predetermined spaced intervals beneath and secured to said side longitudinal beams, a main floor laid on said main frame; a sub-frame comprising upper longitudinal beams spaced apart and inwardly of said main frame side longitudinal beams and overlying said intermediate cross beams, lower longitudinal beams located below said upper longitudinal beams and each including a dropped portion and upwardly inclined forwardly and rearwardly extending portions respectively, the ends of which are securely connected with said upper longitudinal beams, vertical pillars located at spaced intervals between said upper and lower longitudinal beams and connected to said lower longitudinal beams and said cross beams; a sub-floor carried by said lower longitudinal beams, and transverse partitions in said sub-frame for dividing it into a plurality of chambers; and sides for said chambers.

2. In a road vehicle, a main frame comprising side longitudinal beams connected together at the ends by cross beams, intermediate cross beams located at predetermined spaced intervals beneath and secured to said side longitudinal beams, a main floor laid on said main frame; a sub-frame comprising upper longitudinal beams spaced apart and inwardly of said main frame side longitudinal beams and overlying said intermediate cross beams, lower longitudinal beams located below said upper longitudinal beams and each including a dropped portion and upwardly inclined forwardly and rearwardly extending portions respectively, the ends of which are securely connected with said upper longitudinal beams, vertical pillars located at spaced intervals between said upper and lower longitudinal beams and connected to said lower longitudinal beams and said cross beams; a sub-floor carried by said lower longitudinal beams, and transverse partitions in said sub-frame for dividing it into a plurality of chambers; sides for said chambers, one of said chambers constituting a sleeping compartment; and a mattress in said sleeping chamber on said sub-floor.

3. In a road vehicle, a main frame comprising side longitudinal beams connected together at the ends by cross beams, intermediate cross beams located at predetermined spaced intervals beneath and secured to said side longitudinal beams, a main floor laid on said main frame; a sub-frame comprising upper longitudinal beams spaced apart and inwardly of said main frame side longitudinal beams and overlying said intermediate cross beams, lower longitudinal beams located below said upper longitudinal beams and each including a dropped portion and upwardly inclined forwardly and rearwardly extending portions respectively, the ends of which are securely connected with said upper longitudinal beams, vertical pillars located at spaced intervals between said upper and lower longitudinal beams and connected to said lower longitudinal beams and said cross beams; a sub-floor carried by said lower longitudinal beams, and transverse partitions in said sub-frame for dividing it into a plurality of chambers; sides for said chambers; and a metal sheating under said sub-floor.

4. In a road vehicle, a main rectangular frame, composed of side and end beams and cross beams secured together into an integral structure, combined with a sub-frame comprising upper straight longitudinal beams spaced apart from one another and spaced inwardly from said side beams and overlying said cross beams, lower bent truss beams and vertical connecting pillars beneath the respective straight longitudinal beams of the sub-frame, said truss beams having forwardly-upwardly inclined portions and rearwardly upwardly inclined portions and intermediate approximately straight portions, all being constructed as a rigid frame structure, and a main floor over the frame, a sub-floor carried by said sub-frame's lower longitudinals, door-stop frames and doors carried at the sides of said sub-frame, said inclined portions of said sub-frame also serving as skids under predetermined conditions.

5. In a road vehicle, a main load-supporting rectangular frame comprising parallel outer pairs of longitudinal beams and a pair of inner longitudinal beams and transverse beams connecting said longitudinal beams, said longitudinal beams being laterally spaced apart; a pair of longitudinally disposed drop-truss beams located below said inner longitudinal beams and rigidly connected to the same, transverse vertical partitions extending between said inner longitudinal beams and said drop-truss beams and spaced apart to comprise the head wall and the foot wall respectively of a sleeping compartment, a floor for said compartment carried by said drop-truss beams, a ceiling for said compartment carried by said supporting rectangular frame, and side closures for said compartment including doors through which entrance and exit from said compartment can take place.

6. In a road vehicle, a main load-supporting rectangular frame comprising parallel outer pairs of longitudinal beams and a pair of inner longitudinal beams and transverse beams connecting said longitudinal beams, said longitudinal beams being laterally spaced apart; a pair of longitudinally disposed drop-truss beams located below said inner longitudinal beams and rigidly connected to the same, transverse vertical partitions extending between said inner longitudinal beams and said drop-truss beams and spaced apart to comprise the head wall and the foot wall respectively of a sleeping compartment, a floor for said compartment carried by said drop-truss beams, a ceiling for said compartment carried by said supporting rectangular frame, side closures for said compartment including doors through which entrance and exit from said compartment can take place, and means to effect ventilation of said compartment.

7. In a vehicle of the class described, a main frame comprising side longitudinal beams connected together at the ends by cross beams, intermediate cross beams located at predetermined spaced intervals beneath and secured to said side longitudinal beams; a main floor laid on said main frame; a sub-frame comprising upper longitudinal beams spaced apart and inwardly of said main frame side longitudinal beams and overlying said intermediate cross beams, lower longitudinal beams located below said upper longitudinal beams and each including a dropped portion and upwardly inclined forwardly and rearwardly extending portions respectively, the ends of which are securely connected with said upper longitudinal beams, vertical pillars located at spaced intervals between said upper and lower longitudinal beams and connected to said lower longitudinal beams and said cross beams; a sub-floor carried by said lower longitudinal beams, and transverse partitions in said sub-frame for dividing it into a plurality of chambers; sides for said chambers; a water-proof sheathing under said sub-floor, and a water-proof ceiling under said main floor within the sleeping compartment.

JOHN LINWOOD EVANS.